Jan. 16, 1962     A. J. SOBEY     3,016,698
BYPASS ENGINE
Filed July 2, 1959
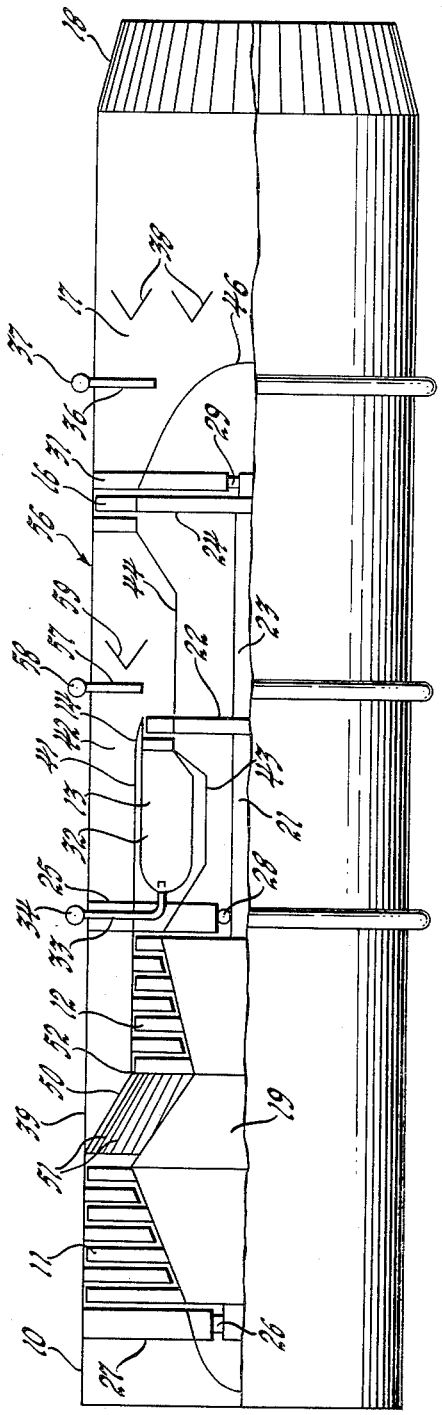
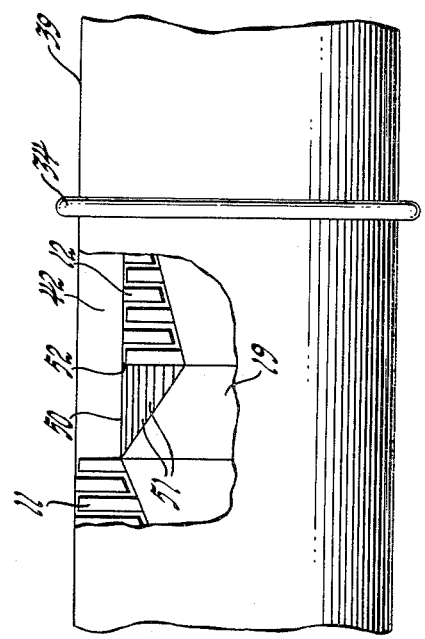
INVENTOR.
Albert J. Sobey
BY
Paul Fitzpatrick
ATTORNEY

United States Patent Office 3,016,698
Patented Jan. 16, 1962

3,016,698
BYPASS ENGINE
Albert J. Sobey, Indianapolis, Ind., assignor to General Motors Corporation, Detroit, Mich., a corporation of Delaware
Filed July 2, 1959, Ser. No. 824,504
5 Claims. (Cl. 60—35.6)

My invention relates to gas turbine engines, including turbojet engines. The invention is directed to a bypass type of engine which has two modes of operation, in one of which it operates at the higher of two pressure ratios and in the other at a considerably lower pressure ratio. By changing the pressure ratio of the engine, it may be adapted to varying operating conditions, such as by operation at the high pressure ratio at subsonic flight speeds and operation at the lower pressure ratio at supersonic flight speeds. The invention also simplifies the problems of starting and control of a high pressure ratio engine.

The nature of the invention and the advantages thereof will be clear to those skilled in the art from the succeeding detail description of a preferred embodiment thereof and the accompanying drawings.

FIGURE 1 is a schematic or line illustration of a turbojet engine, parts being shown in section in a plane containing the axis of the engine.

FIGURE 2 is a partial view of the same showing a second mode of operation.

Since an engine according to the invention may be composed of conventional elements and subassemblies and the structure, except as hereinafter pointed out, may be of a nature well known in turbojet engines, the engine is illustrated diagrammatically; and, in the interest of conciseness and clarity, immaterial details will not be enlarged upon.

Referring to FIGURE 1, an axial flow turbojet engine is depicted; it comprises an air inlet section 10, a first axial flow compressor 11, a second axial flow compressor 12, first combustion apparatus 13, a first turbine 14, a second turbine 16, an after burner 17, and a variable jet nozzle 18 arranged coaxially in series. The compressors 11 and 12 have a common annular rotor structure 19 connected by a shaft 21 to the rotor 22 of the first turbine and by a further shaft 23, which may be an extension of shaft 21, to the rotor 24 of the second turbine. All of the rotating parts 19, 21, 22, 23 and 24 are coupled for concurrent rotation, constituting one composite rotor. The rotor is mounted in a forward roller bearing 26 supported by struts 27 in the air inlet section, by a ball thrust bearing 28 supported by struts 25 downstream of the second compressor, and by a roller bearing 29 supported by struts 31 downstream of the second turbine.

The first combustion apparatus 13 may comprise an annular duct within which are mounted a number of flame tubes 32 each of which is supplied with fuel through a branch pipe 33 leading from a manifold 34. The afterburner 17 may be supplied with fuel by spray bars 36 supplied by an annular manifold 37. The usual flameholders 38 are provided. The outer shell of the engine is defined by a continuous annular wall 39 which may be composed of a number of sections suitably fixed together. An intermediate annular wall 41 extending from the inlet end of the second compressor past the first turbine defines with the outer wall 39 a bypass duct 42 and provides the outer case of the compressor 12 and combustion apparatus 13. An inner shroud 43 defines the inner wall of the first combustion apparatus. An inner shroud 44 defines the inner wall of the motive fluid duct between turbine 14 and turbine 16. A tailcone 46 is provided downstream of the second turbine.

An annular valve 50 is composed of a ring of overlapping flaps 51 pivoted to the forward end of the intermediate wall 41 at 52. Suitable means of known type are provided to move the flaps concurrently from an outer position, as shown in FIG. 1, to an inner position, as shown in FIG. 2. In the outer position, the forward ends of the flaps engage outer shell 39 to close the forward end of the bypass duct 42 and direct the discharge from compressor 11 through compressor 12. The two compressors, and also the two turbines, operate in series. This is the high pressure ratio mode of operation.

In their inner position, the forward ends of flaps 51 are substantially in contact with the rotor 19, opening the bypass duct and closing off flow into the second compressor 12. Thus there is no flow through compressor 12, combustion apparatus 13, or turbine 22. Only compressor 11 and turbine 16 are operative, and operation is in the low pressure ratio mode.

In low pressure ratio operation, the motive fluid is heated by a second combustion apparatus 56 arranged to be supplied through bypass duct 42. This combustion apparatus may comprise fuel spray bars 57, supplied by a manifold 58, and a flameholder 59. Preferably, combustion apparatus 56 is downstream from turbine 14 so that it may be employed with reduced fuel supply as a reheater between the turbines in the high pressure ratio mode of operation. In the low ratio operation, no fuel is supplied to combustion apparatus 13.

Suitable means (not shown) of any usual sort, may be provided to supply fuel selectively and under proper control to the fuel manifolds 34, 58 and 37 from which the fuel is supplied to the combustion apparatuses 13 and 56 and the afterburner 17, respectively.

It will be seen that the invention provides an engine operable at two different pressure ratios, and with very simple structure. The engine preferably is started in the low ratio, flown at low speeds in the high ratio mode, and flown at very high speeds, where ram compression is high, in the low ratio mode.

The scope of the invention is not to be considered as limited by the detailed description of the preferred embodiment to explain the principles thereof.

I claim:

1. A gas turbine engine comprising, in combination, a first compressor, annular valve means, a second compressor, a first combustion apparatus, a first turbine, a second combustion apparatus, and a second turbine arranged coaxially for series flow therethrough in the order named; and an annular bypass duct connecting the first compressor to the second combustion apparatus disposed around and bypassing the second compressor, the first combustion apparatus, and the first turbine; the annular valve means being movable to direct the flow from the first compressor alternatively to the second compressor or to the bypass duct.

2. A turbojet engine comprising, in combination, a first compressor, a second compressor, a first combustion apparatus, a first turbine, a second combustion apparatus, a second turbine, an afterburner, and a jet nozzle arranged for series flow therethrough in the order named; a bypass duct connecting the first compressor to the second combustion apparatus bypassing the second compressor, the first combustion apparatus, and the first turbine; valve means movable to direct the flow from the first compressor alternatively to the second compressor or to the bypass duct; and means for selectively supplying fuel to the first and second combustion apparatuses.

3. A turbojet engine comprising, in combination, a first compressor, annular valve means, a second compressor, a first combustion apparatus, a first turbine, a second combustion apparatus, a second turbine, an afterburner, and a jet nozzle arranged coaxially for series flow therethrough in the order named; an annular bypass duct connecting the first compressor to the second combustion apparatus disposed around and bypassing the second compressor, the first combustion apparatus, and the first turbine; the annular valve means being movable to direct the flow from the first compressor alternatively to the second compressor or to the bypass duct; and means for selectively supplying fuel to the first and second combustion apparatuses.

4. A turbojet engine comprising, in combination, a first compressor, annular valve means, a second compressor, a first combustion apparatus, a first turbine, a second turbine, an afterburner, and a jet nozzle arranged coaxially for series flow therethrough in the order named; an annular bypass duct disposed around and bypassing the second compressor, the first combustion apparatus, and the first turbine; the annular valve means being movable to direct the flow from the first compressor alternatively to the second compressor or to the bypass duct; and second combustion apparatus ahead of the second turbine supplied with air by the first compressor through the bypass duct.

5. A turbojet engine comprising, in combination, a first compressor, annular valve means, a second compressor, a first combustion apparatus, a first turbine, and a second turbine arranged coaxially for series flow therethrough in the order named; an annular bypass duct disposed around and bypassing the second compressor, the first combustion apparatus, and the first turbine; the annular valve means being movable to direct the flow from the first compressor alternatively to the second compressor or to the bypass duct; second combustion apparatus ahead of the second turbine supplied with air by the first compressor through the bypass duct; and means for selectively supplying fuel to the first and second combustion apparatuses.

References Cited in the file of this patent

UNITED STATES PATENTS

| | | |
|---|---|---|
| 2,588,532 | Johnson | Mar. 11, 1952 |
| 2,930,190 | Rogers | Mar. 29, 1960 |

FOREIGN PATENTS

| | | |
|---|---|---|
| 704,669 | Great Britain | Feb. 24, 1954 |
| 713,783 | Great Britain | Aug. 18, 1954 |
| 243,957 | Switzerland | Feb. 17, 1947 |